United States Patent
Hauser et al.

(10) Patent No.: US 11,157,613 B2
(45) Date of Patent: Oct. 26, 2021

(54) SYSTEMS AND METHODS FOR MONITORING POWER CONSUMPTION

(71) Applicant: Arm IP Limited, Cambridge (GB)

(72) Inventors: Niklas Lennart Hauser, Cambridge (GB); Brendan James Moran, Histon (GB); Milosch Meriac, Cambridge (GB)

(73) Assignee: Arm IP Limited, Cambridge (GB)

( * ) Notice: Subject to any disclaimer, the term of this patent is extended or adjusted under 35 U.S.C. 154(b) by 243 days.

(21) Appl. No.: 15/982,582

(22) Filed: May 17, 2018

(65) Prior Publication Data

US 2019/0354681 A1   Nov. 21, 2019

(51) Int. Cl.
*G06F 12/14* (2006.01)
*G06F 21/55* (2013.01)
*G06F 8/65* (2018.01)
*G06F 1/3212* (2019.01)
*G06F 9/4401* (2018.01)
*G06F 1/3234* (2019.01)

(52) U.S. Cl.
CPC .......... *G06F 21/554* (2013.01); *G06F 1/3212* (2013.01); *G06F 8/65* (2013.01); *G06F 1/3234* (2013.01); *G06F 9/4401* (2013.01); *G06F 2221/034* (2013.01)

(58) Field of Classification Search
CPC .......... G06F 8/65; G06F 1/266; G06F 1/3212; G06F 1/3234; G06F 21/554; G06F 11/3013; G06F 11/3062; G06F 9/4401; G06F 2221/034
USPC .......................................................... 726/23
See application file for complete search history.

(56) References Cited

U.S. PATENT DOCUMENTS

| | | | |
|---|---|---|---|
| 7,872,774 B2 * | 1/2011 | Okamoto ........... | G03G 15/5004 358/1.16 |
| 9,118,220 B2 * | 8/2015 | Lamb .................. | H02J 13/0086 |
| 9,244,675 B2 * | 1/2016 | Tsuji ..................... | G06F 1/3284 |
| 9,268,938 B1 * | 2/2016 | Aguayo Gonzalez ....... | G01R 31/2891 |
| 9,537,313 B2 * | 1/2017 | Thornton ................ | H02J 9/062 |
| 9,820,225 B2 * | 11/2017 | Ang .................. | H04W 52/0261 |
| 9,996,142 B2 * | 6/2018 | Bulusu .................. | G06F 1/3287 |
| 10,057,642 B2 * | 8/2018 | Hsueh ................ | H04N 21/4432 |
| 10,069,299 B2 * | 9/2018 | Van Den Briel ....... | G06F 17/18 |
| 10,209,999 B2 * | 2/2019 | He ....................... | G06F 11/1433 |
| 10,324,703 B2 * | 6/2019 | Choi .......................... | G06F 8/65 |
| 2014/0006823 A1 | 1/2014 | Lamb | |

* cited by examiner

*Primary Examiner* — Amare F Tabor
(74) *Attorney, Agent, or Firm* — Leveque Intellectual Property Law, PC (57) ABSTRACT

Broadly speaking, the present techniques provide methods, apparatus and systems for monitoring operation of a device. More particularly, the present techniques provide methods for monitoring operation of a device based on a device firmware update that is associated with at least one power profile.

18 Claims, 7 Drawing Sheets

SYSTEMS AND METHODS FOR MONITORING POWER CONSUMPTION

CROSS-REFERENCE TO RELATED APPLICATIONS

This application is related to the following co-pending U.S. patent application: application Ser. No. 15/982,560, entitled "SYSTEMS AND METHODS FOR MONITORING STATE TRANSITIONS," filed on May 17, 2018, which is incorporated herein in its entirety.

FIELD OF THE INVENTION

The present techniques generally relate to methods, apparatuses and systems for monitoring operation of a device, and in particular to monitoring power consumption of a device using a power profile.

BACKGROUND

There are ever increasing numbers of devices within the home, office buildings or the outdoor environment that have processing and communication capabilities which allow such devices to interact with other processing devices and cloud services. Everyday objects and relatively small-scale processing devices may be connected to each other and to central platforms as part of the "Internet of Things" (IoT). For example, a heating system in the home may gather information from various temperature sensors and control the activation of heaters based on the gathered information; a factory pollution monitoring sensor may gather information from various chemical sensors and arrange maintenance based on the gathered information; whilst a healthcare provider may use wireless sensors, such as a heart rate monitor to track the health of patients while they are at home. In the cases described above, the data is generally forwarded to a cloud service on the internet.

Such IoT devices tend to be wireless and battery-operated, as wired devices are expensive to install and may not be scalable. The lifetime of battery-powered devices may be sufficiently long for their required purpose, and some may be wirelessly chargeable. However, a malicious attack on an IoT device could significantly or entirely drain the device battery, such that, for example, a device lifetime of ten years is reduced to half a day. This vulnerability may make battery-powered IoT devices expensive and undesirable.

The present disclosure broadly provides technologies to improve the security and operational lifetime of devices.

BRIEF DESCRIPTION OF THE DRAWINGS

The techniques are diagrammatically illustrated, by way of example, in the accompanying drawings, in which.

DETAILED DESCRIPTION

According to a first aspect of the present techniques, there is provided a machine-implemented method of monitoring operation of a device, the method comprising: receiving, at the device, a firmware update associated with at least one power profile for a device process, the power profile comprising: at least one power consumption band defining a range of possible power consumption values over time of the device process, each power consumption band associated with a probability that the device process power consumption falls within the power consumption band.

According to a second aspect of the present techniques, there is provided an apparatus comprising: at least one battery; at least one monitoring device to monitor power consumption; and at least one processor; and at least one communication module to receive a firmware update associated with at least one power profile for a device process, the power profile comprising: at least one power consumption band defining a range of possible power consumption values over time of the device process, each power consumption band associated with a probability that the device process power consumption falls within the power consumption band.

According to a third aspect of the present techniques, there is provided a system comprising: at least one server; and at least one apparatus, the apparatus comprising: at least one battery; at least one processor to; and at least one communication module to communicate with the at least one server and to receive a firmware update associated with at least one power profile for a device process, the power profile comprising: at least one power consumption band defining a range of possible power consumption values over time of the device process, each power consumption band associated with a probability that the device process power consumption falls within the power consumption band.

According to a related aspect of the present techniques, there is provided a non-transitory data carrier carrying code which, when implemented on a processor, causes the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Broadly speaking, the present techniques provide methods, apparatus and systems for monitoring operation of a device. More particularly, the present techniques provide methods for monitoring operation of a device based on a device firmware update that is associated with at least one power profile.

In embodiments, a device receives a firmware update associated with at least one power profile and may install the firmware update. The or each associated power profile may comprise at least one power consumption band that defines a range of possible power consumption values over time for a particular device process. The device may monitor the power consumed by a device process and compare it with the information in the power profile for that device process to determine whether the device process is operating as expected, or if the device process is consuming more or less power than defined in the power profile. If the device process is consuming more power than expected, the device may take action to reduce the power consumption, to improve the security and operational lifetime of the device. In other embodiments, a device may analyse the firmware update, and in particular, the associated power profile(s), to determine whether installing the firmware update may reduce the operational lifetime of the device. If the power profile(s) associated with the firmware update indicate that more power is going to be consumed by a particular device process, such that the lifetime of the device may be reduced, the device may require additional permission or authorisation to install the firmware update.

Accordingly, the present techniques generally provide methods for using power profiles associated with firmware updates to monitor and control the operation of a device. The techniques may help to enable the identification of malicious firmware (malware) or a malicious attack on the device, or of firmware which (perhaps inadvertently) would cause device power consumption to increase significantly and device lifetime to decrease significantly.

The term "device process" is used herein to generally mean any process which takes place within the device that is being monitored, or in an external peripheral that is connectable to the device that is being monitored. The device process, wherever it occurs, consumes power from the power source of the device that is being monitored. The device process, wherever it occurs, may be a hardware process or a software process.

The present techniques are now described in more detail with reference to the drawings.

Figure 1:
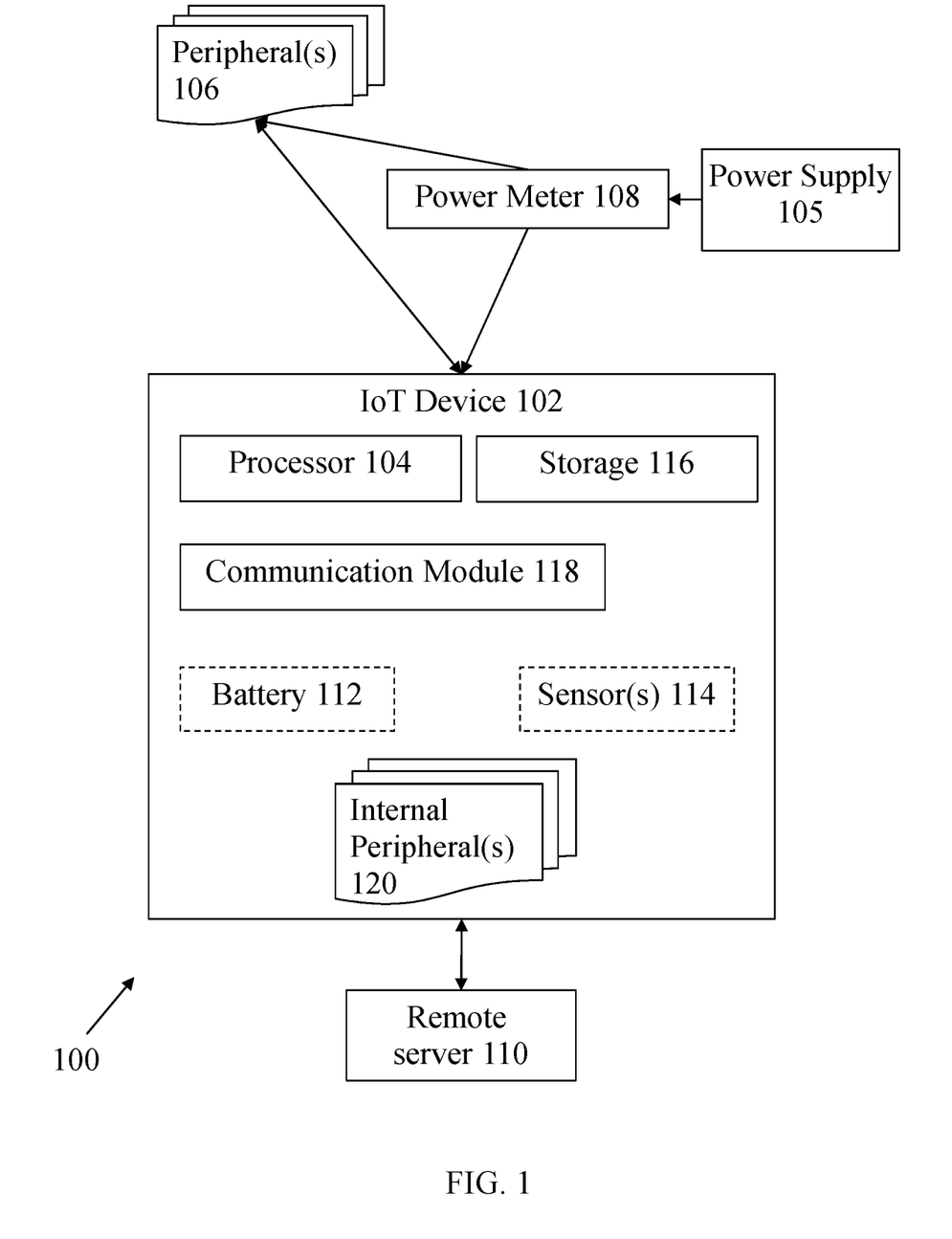
FIG. 1 shows a schematic diagram of a system for monitoring operation of a device.

FIG. 1 shows a schematic diagram of a system 100 for monitoring operation of a device 102. The system 100 may comprise multiple devices 102—a single device 102 is shown in FIG. 1 for the sake of simplicity.

The devices 102 in system 100 may be any type of electronic device. In embodiments, the device 102 is an Internet of Things (IoT) device. The device 102 may be a constrained resource device. For example, device 102 may be a constrained power device, because the device 102 may not be mains-powered. The term "device" is used interchangeably herein with the terms "apparatus", "IoT device", "electronic device", and "sensor".

The device 102 may comprise a processor 104, which may be coupled to communication module 118 and/or storage 116 (as well as other components of the device). The processor 104 may comprise processing logic to process data (e.g. data regarding the power consumed by the device or a device process), and may generate output data or instructions in response to the data processing. The processor 104 may comprise one or more of: a microprocessor, a microcontroller, and an integrated circuit. In embodiments, the communication module 118 may comprise a dedicated processor.

The device 102 may comprise a communication module 118 to transmit data packets/messages to, and receive data packets/messages from, other elements within system 100, such as remote server 110 or other devices 102. The communication module 118 may be any communication module suitable for sending and receiving data packets/messages, or may be a communication module configured to (or adapted to) send and receive data. The communication module 118 may use any suitable communication protocol/technique to communicate with other elements within system 100, such as, but not limited to, wireless communication (e.g. WiFi), short range communication such as radio frequency communication (RFID) or near-field communication (NFC), or by using the communication protocols specified by ZigBee, Thread, Bluetooth, Bluetooth LE, IPv6 over Low Power Wireless Standard (6LoWPAN), or Constrained Application Protocol (CoAP). The communication module 118 may use a wireless mobile (cellular) telecommunication protocol to communicate with remote machines, e.g. 3G, 4G, 5G, etc. In embodiments, the communication module 118 may communicate with other elements using wired communication techniques, such as via metal cables or fibre optic cables. The communication module 118 may use more than one communication technique to communicate with other elements in system 100.

The device 102 may comprise storage 116. The storage 116 may comprise a volatile memory, such as random access memory (RAM), for use as temporary memory, and/or non-volatile memory such as Flash, read only memory (ROM), or electrically erasable programmable ROM (EEPROM), for storing data, programs, or instructions, for example.

The device 102 may, in embodiments, not be mains-powered, or may not be mains-powered at all times. Thus, the device 102 may comprise at least one battery 112 as the device power supply.

The device 102 may comprise at least one sensor 114. For example, the sensor 114 may be a temperature sensor, which may be able to sense/measure the temperature of processor 104. The temperature of the processor 104 may be an indirect indicator of an aggregated power consumption of all device processes that are consuming power at a particular time. The sensor 114 may be a current sensor (or hole sensor), or a voltage sensor/voltmeter, which may enable the aggregated power consumption to be determined. The sensor 114 may be a sensor able to measure the pulse width of a DC to DC convertor. The sensor 114 may be able to measure one or more power supply parameters, which may be indirect indicators of power consumption.

The device 102 may comprise one or more internal peripherals 120, i.e. elements that are coupled to the processor or CPU 104. The internal peripheral 120 may be a cryptographic accelerator, a direct memory access (DMA), an inter-integrated circuit (I²C), an EEPROM chip, an accelerometer, a serial peripheral interface (SPI), an image capture device, a microphone, a touch screen, etc., though it will be understood this is a non-limiting list of possible examples. The internal peripheral(s) 120 may consume power from the power source of the device 102.

The system 100 may comprise one or more external peripherals 106 that are couplable to/coupled to the device 102. The peripheral 106 may be any auxiliary device that may be couplable to the device 102. When coupled to the device 102, the external peripheral 106 may consume power from the power source of the device 102.

The system 100 may comprise a power meter 108, which may be couplable to/coupled to the device 102 to monitor the aggregated power consumption of all device processes. The power meter 108 may be positioned between a power supply 105 and the IoT device 102 (i.e. along a path between the power supply and the IoT device 102) or between the power supply and a measured peripheral. The power meter 108 may measure the total power consumption of the device 102 at a given time, which may include the power consumed by the CPU 104, the communication module 118, internal peripherals 120, internal sensors 114, etc. If the device 102 comprises one or more hardware-supported power tracking points on a circuit board of the device 102, these may be useable to measure both the internal and external power consumption of the device 102, i.e. the power consumed by the core components within device 102 which perform processing functions, and the power consumed by other elements which are close to/coupled to device 102 (which may be considered "tightly coupled peripherals") and are on the same circuit board/chip as the core components that do the processing of the device 102, and the power consumed by other elements which are loosely coupled to the device ("loosely coupled peripherals") and are "off chip", i.e. are not on the same circuit board/chip as the core components. An example of a "tightly coupled peripheral" may be a Serial Peripheral Interface (SPI) Master, and an example of a "loosely coupled peripheral" may be an SPI analogue to digital converter (ADC). In other words, the "internal" power consumption may be the power consumed by the core components, and the "external" power consumption may be the power consumed by internal peripherals 120 and/or external peripherals 106 coupled to device 102. The definition of tightly-coupled peripheral power, and loosely coupled peripheral power above notwithstanding, present techniques apply to just core power and peripheral power.

In embodiments, the tracking points may enable the power consumption of the CPU 104 to be measured (i.e. "internal" power) and the power consumption of other elements on the circuit board of the device to be measured (i.e. "external" power). Information may be stored in the device 102 that comprises modelled internal power consumption for the device 102. This modelled data may help to attribute internal power consumption to particular elements/components within device 102. This may help to determine how much power is being used by particular elements on the circuit board, and therefore, determine if any elements are consuming more power than they are expected to consume. In embodiments where only a single power tracking point exists on a circuit board of the device 102, the tracking point may still be useable to measure power consumption of the device 102. The modelled data may be used to estimate the internal power consumption of the device, subtract it from total power consumption (that may be measured using power meter 108), and to attribute the external power consumption to particular elements/components or peripherals.

Figure 5A:
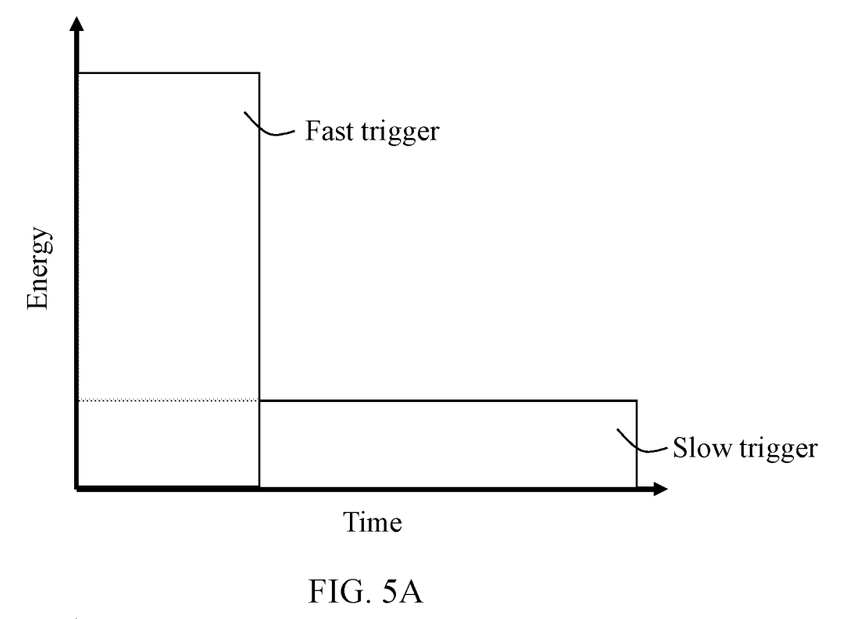
FIG. 5A is an example graph of energy consumption of a device process over time.

Turning to FIG. 5A, this shows an example graph of energy consumption of a device process over time. Some device processes may use lots of energy in a short time period, which may result in a fast trigger within the device 102 that the device process is using more power than expected. Some device processes may use the same amount of energy over a longer time period, and so while they may also consume more power than expected, they may result in a slow trigger within the device 102. Thus, it may be important to monitor the power consumption of a device process over a period of time rather than just monitoring instantaneous power consumption.

Figure 5B:
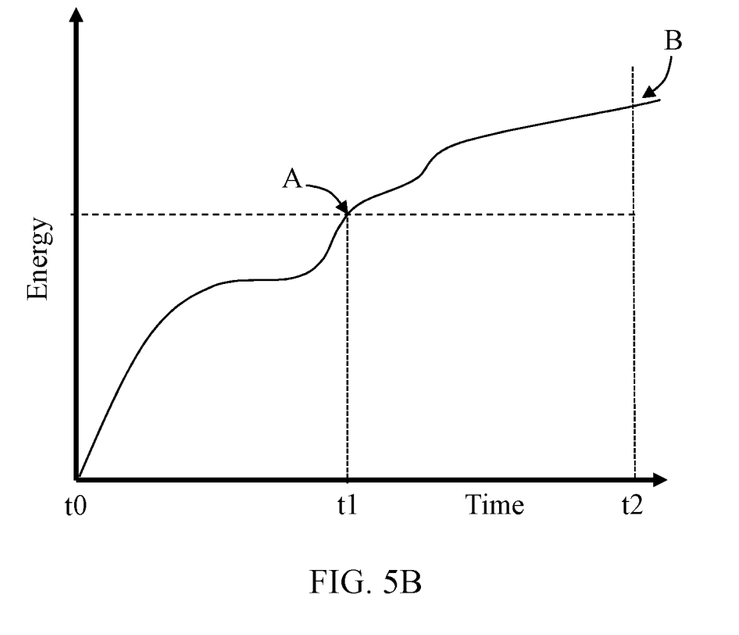
FIG. 5B is an example graph of energy consumption of a device process over time and how monitoring this energy consumption may be used to monitor operation of a device.

FIG. 5B is an example graph of energy consumption of a device process over time and how monitoring this energy consumption may be used to monitor operation of a device. At time t0, the device process may begin consuming power, and monitoring of the power consumption may begin. At time t1, it is determined that the device process is either at, or has just exceeded, the expected power or energy consumption for the device process, as indicated by the horizontal dashed line. At this stage, the device process may be allowed to continue operating. At time t2, the power of the device process may be monitored/measured again. If the power consumed at time t2 indicates that the energy consumed by the device process is increasing (i.e. that B>A), then the device 102 may decide to terminate the device process.

Device processes/tasks are generally interleaved, meaning that multiple device processes may take place at any given time. This means that the power consumed by a device 102 at a given time may be attributed to multiple device processes, but it may be difficult from this to determine which device process is consuming more power than expected. It may be necessary to perform statistical analysis or otherwise to determine which device process is consuming more power than expected. This analysis may utilise a scheduler within device 102 which monitors when each device process takes place, as well as the power profile information stored in device 102 for each device process. It may also be necessary to account for any peripheral devices (internal and/or external), which may cause power to be consumed by device 102.

Thus, in embodiments, monitoring power consumption may comprise: monitoring, using at least one monitoring apparatus, power directly consumed by the device process.

In embodiments, monitoring power consumption may comprise: monitoring, using at least one monitoring apparatus, aggregated power consumed by the device while the device process is running; and disaggregating the aggregated power to determine the power consumed by the device process.

Turning back to FIG. 1, the system 100 may comprise at least one remote server 110. The remote server 110 may be able to communicate with the or each device 102 in system 100. The remote server 110 may send firmware updates to each device 102 in system 100, where each firmware update may be associated with at least one power profile for a device process. The remote server 110 may send the firmware updates as a firmware manifest containing a pointer to a location from which the firmware itself may be obtained, for example a Uniform Resource Locator (URL). The firmware update (or firmware manifest) may comprise the at least one power profile, or may contain a pointer (e.g. a URL) to a location from which the power profile(s) may be obtained.

Figure 2:
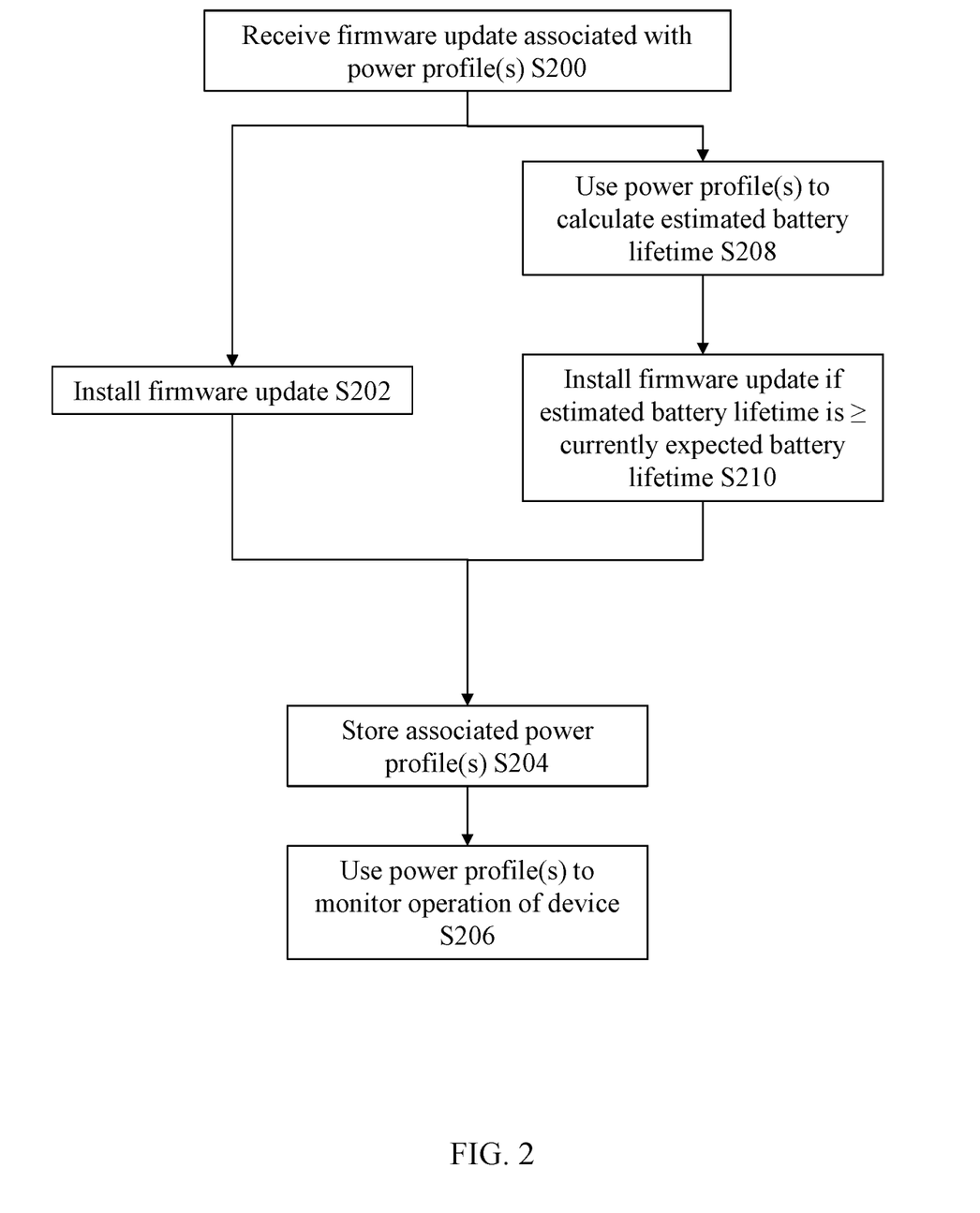
FIG. 2 shows a flowchart of example steps which may occur when a device receives a firmware update.

Turning to FIG. 2, this shows a flowchart of example steps which may occur when a device 102 receives a firmware update. More specifically, FIG. 2 shows two possible ways the device 102 may process a received firmware update. The processing begins, in either case, when device 102 receives a firmware update that is associated with at least one power profile for at least one device process (step S200). Each power profile may relate to a particular device process, but multiple power profiles may be provided for a particular device process (e.g. for different states of the device process). The firmware update may be sent to the device 102 directly at step S200. Additionally or alternatively, the device 102 may receive a firmware manifest at step S200, which contains a pointer (for example a URL) to a location from which the firmware itself may be obtained. The firmware update (or firmware manifest) may comprise the at least one power profile, or may contain a pointer to a location from which the power profile(s) may be obtained.

Figure 7:
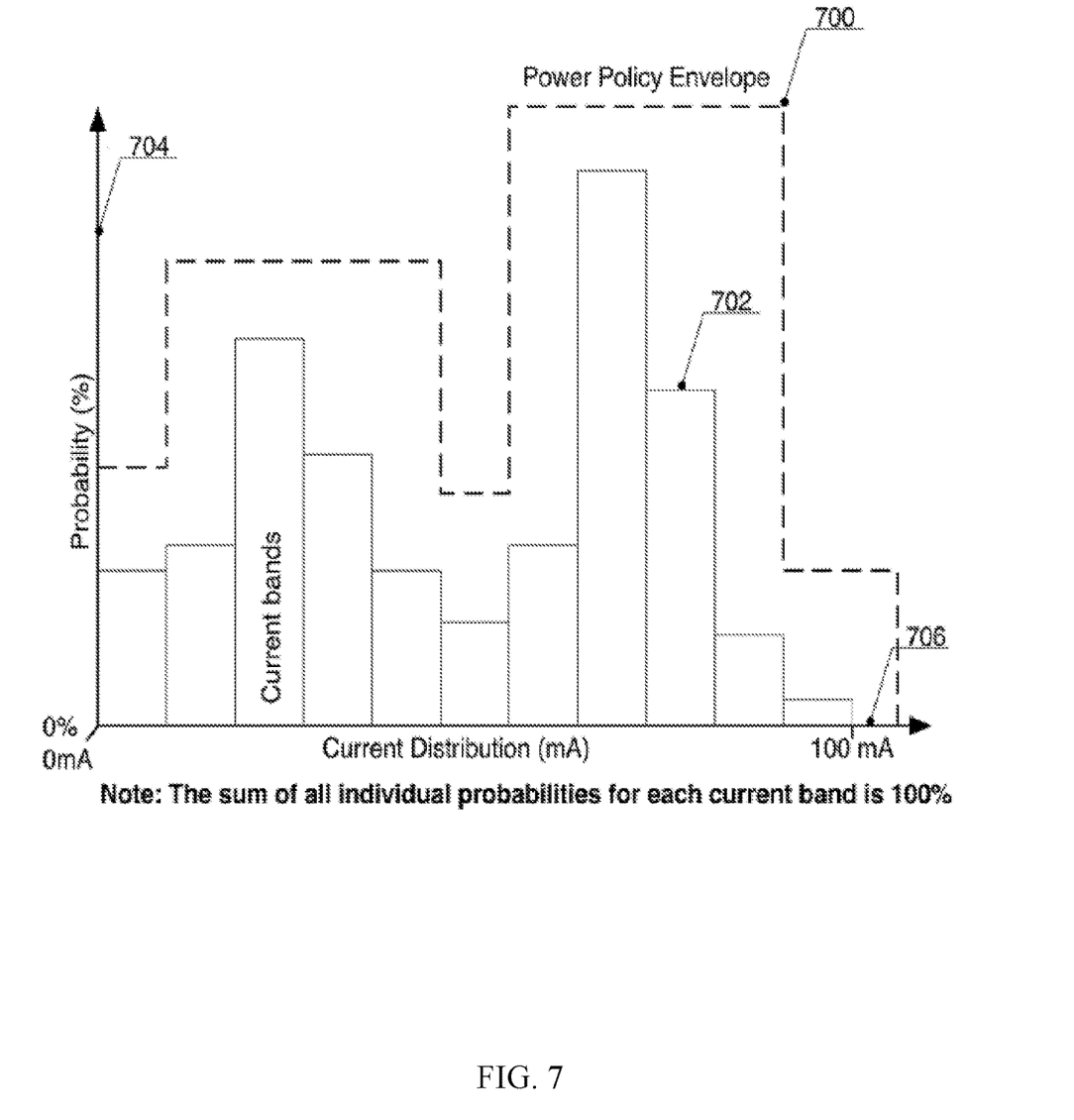
FIG. 7 is a graph showing how a power consumption profile may comprise a probability distribution having one or more bands, and/or may comprise a probability envelope having one or more peaks.

The or each power profile associated with a particular device process may comprise a power consumption probability distribution having at least one power consumption band. The power consumption probability distribution defines the likelihood of a certain power being consumed (or current being drawn) during a particular time window/time period ($\Delta t$). FIG. 7 is a sketch showing how a power profile may comprise a power consumption probability distribution having one or more bands. The graph in FIG. 7 shows the probability (y axis) of a particular current being consumed/drawn by a device process (x axis). There are a number of peaks or bands indicating the most likely amounts of current to be consumed by a device process. Some peaks/spikes in power consumption/current consumption are expected, but do not occur frequently, and therefore the probability distribution shows how likely each peak/spike is. The probability distribution may be established by testing a device or by modelling a device. However, while the probability distribution provides a statistical likelihood of a specific current or power being consumed by a device process, in reality, a device process may not consume precisely the same current/power as one of the bands of the probability distribution. For example, a probability distribution may indicate that a device process has a very high chance of consuming 100 mA, but in reality, only 95 mA may be measured. In this case, it may appear that the device process is behaving in an unexpected way, but this may be because the probability distribution bands do not have tolerances or allow for statistical error.

Therefore, the or each power profile associated with a particular device process may comprise a power consumption probability envelope. As shown in FIG. 7, the power (or current) consumption probability envelope forms an envelope around the probability distribution, such that instead of there being multiple peaks/spikes, there are larger/wider windows of expected power/current consumption, which allow for errors in measurements and provides some tolerance. In this case, the power/current consumed by a device process is expected to remain within the envelope (i.e. below the envelope line in FIG. 7). The amount of time for which the device process falls outside the envelope (i.e. above the envelope line in FIG. 7) may be used to identify unexpected behaviour. Similarly, the extent to which the device process falls outside the envelope, that is by how much the device process falls outside the envelope, may be used to identify unexpected behaviour. A small amount of time outside of the envelope may be considered similar to a slow trigger (see FIG. 5A), while a large amount of time outside of the envelope may be considered similar to a fast trigger (see FIG. 5A).

For context, the distribution of bands in FIG. 7. can be for a given time window and resolution (with what probability was the current/power within a 60-70 mA window and so on). Both the windows and the probabilities can be optionally logarithmic or arbitrarily sized.

The widths of each window can optionally also be arbitrary size—let's say the following bands:
Band 0: 0-100 uA,
Band 1: 100-300 uA,
Band 2: 300-700 uA,
Band 3: 700-1.5 mA,
Band 4: 1.5 mA-3 mA,
Band 5: 1.5 mA-10 mA,
Band 10: 80-110 mA In power consumption probability envelope may be determined in two ways. For example, the envelope may be calculated over a sliding time window, over discrete overlapping time windows or over non-overlapping time windows. The time windows have length Twindow and are split into N discrete time steps $\Delta t$ and M discrete power bands. Within each time step $\Delta t$, the power consumption in the time step is averaged and quantised into one of the M power bands such that $N*\Delta t$=Twindow. In this embodiment, the probability of a power consumption being in a band M during a time $\Delta t$ is calculated. This results in a probability distribution (as shown in FIG. 7), and the envelope may be formed around the probability distribution (as shown by the envelope line in FIG. 7). The probability axis and the power/current axis may be linear axes or non-linear axes. As will be explained below, in some cases, it may be useful to send power consumption data to an external server for analysis. To reduce the amount of data to be transmitted to the external server, it may be useful to represent the probability distribution or probability envelope using one or more non-linear axes. For example, at least one of the axes may use a logarithmic scale if equal resolution is not required or needed across the whole scale or range of values, which may reduce the amount of data being transmitted. Thus, the probability distribution or envelope may be compressed for transmission, and/or for storing the power profile for use within the IoT device 102, and/or for storing data to be analysed.

Another way to determine the power consumption probability envelope is by performing a fast Fourier transform (FFT) over the power/current consumption window—this can be used to measure dynamic behaviour. The envelope may be used to define policies for frequency components and their individual magnitude in the power/current consumption patterns.

The two techniques may be used separately or in combination. Furthermore, it may also be useful to measure power/current consumption using windows of different sizes in parallel. For example, if N (the number of discrete time steps) is always the same (e.g. 1024), but the power consumption patterns may require multiple windows of different sizes (e.g. Twindow is one second, one minute, one hour, one day and/or one week), then $\Delta t$ would be different for each window length (because $\Delta t$=Twindow/N). in this case, it may be useful to use both techniques for these different Twindow lengths in parallel and apply distinct profiles for different window sizes.

Returning to FIG. 1, as mentioned above, the device 102 may monitor the power consumed by a device process and compare it with the information in the power profile for that device process, to determine whether the device process is operating as expected or if the device process is consuming more or less power than defined in the power profile. If there are multiple power profiles associated with the same device process, the device must use the appropriate power profile to assess whether the device process power consumption is expected. For example, there may be an "idle" power profile for a device process when it is in an idle state, there may be an "active" power profile for when the device process is active, and there may be a "communication with X" power profile for when the device process involves communicating with an element X (e.g. another device or remote server 110).

FIG. 2 shows two example processing actions that may be undertaken when a firmware update is received at step S200.

In embodiments, the device 102 may (obtain and) install the received firmware update (step S202), and may (obtain and) store the associated power profile(s) in storage 116 (step S204). Information about which power profiles are associated with each device process, and for which operational state, may be stored in a look-up table or similar, to enable the device 102 to readily determine which power profile to use to determine if the device process power consumption is as expected. The processor 104 may use the power profiles stored in storage 116 to monitor the operation of the device 102 (step S206). This will be described in more detail below with respect to FIG. 3.

In embodiments, the device 102 may not immediately install the received firmware update or may not immediately obtain the firmware update pointed to in a received firmware manifest. Instead, the processor 104 may analyse the power profiles(s) associated with the firmware update/firmware manifest to determine whether installing the firmware update may reduce the operational lifetime of the device 102. The operational lifetime of the device 102 may be reduced if, for example, the device 102 is battery-powered—if the firmware update means the device 102 starts to consume more power, the device 102 will use more power from the battery and therefore, the overall lifetime of the device 102 may be shortened. Thus, at step S208, the processor 104 may use the power profile(s) to calculate a current estimated device lifetime (or battery lifetime). If the power profile(s) associated with the firmware update indicate that more power is going to be consumed by a particular device process, such that the lifetime of the device 102 may be reduced, the device 102 may require additional permission or authorisation to install the firmware update. This analysis is described in more detail below with respect to FIG. 4. However, if the estimated device lifetime is greater than or equal to the currently expected battery lifetime (which may have been specified by the device manufacturer or otherwise), then the device 102 may proceed to (obtain and) install the firmware update (step S210), and to (obtain and) store the associated power profile(s) in storage 116 (step S204). The processor 104 may use the power profiles stored in storage 116 to monitor the operation of the device 102 (step S206).

Accordingly, in embodiments of the present techniques, there is provided a method of monitoring operation of a device, the method comprising: receiving, at the device, a firmware update associated with at least one power profile for a device process, the power profile comprising: at least one power consumption band defining a range of possible power consumption values over time of the device process, each power consumption band associated with a probability that the device process power consumption falls within the power consumption band.

In embodiments, the method may comprise storing the at least one power profile following installation of the firmware update. In an alternative embodiment, the at least one power profile may be received and stored prior to installation of the firmware update to which the power profile relates.

Figure 3:
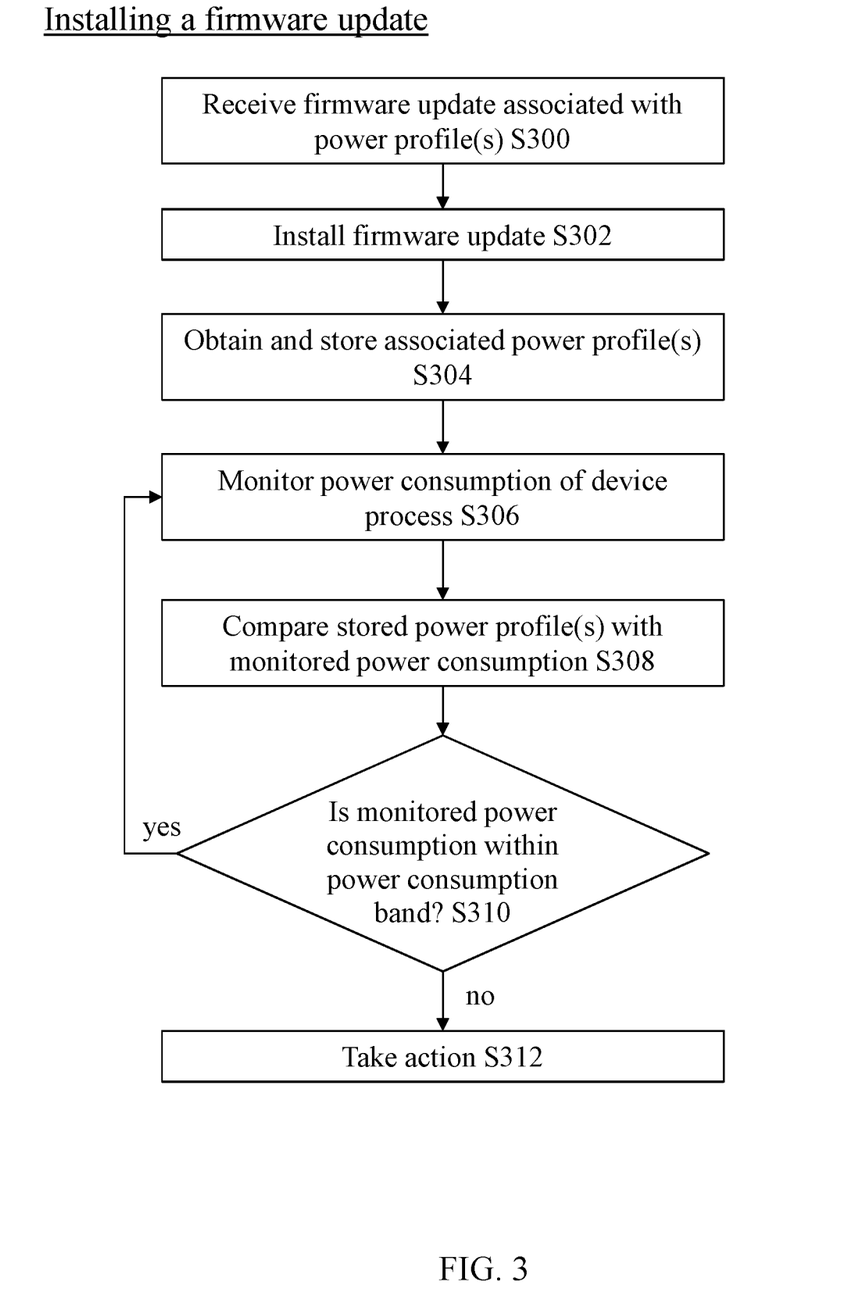
FIG. 3 shows a flowchart of example steps for monitoring operation of a device which occur after a device receives and installs a firmware update.

FIG. 3 shows a flowchart of example steps for monitoring operation of a device, which may occur after a device receives and installs a firmware update. The flowchart corresponds to the processing action shown on the left-hand branch of FIG. 2.

At step S300, the device 102 receives a firmware update associated with at least one power profile, or a firmware manifest, as explained above with respect to FIG. 2. If the device 102 receives a firmware manifest, the device 102 may use information within the manifest to determine where the update itself is located and may then proceed to download, request or otherwise obtain the update from this location. Once the device 102 has the firmware update (software), the device 102 installs the firmware update (step S302). If the firmware update comprises at least one power profile, the device 102 stores the power profile(s) in storage 116 (step S304). If the firmware update comprises pointers to where the or each power profile can be found, the device 102 may first obtain/download each power profile, and then stores the power profile(s) in storage 116. The processor 104 is now able to use the power profile(s) to monitor the operation of the device 102. Each power profile associated with a particular device process may comprise at least one power consumption band that defines a range of possible power consumption values over time for that device process.

At step S306, the device 102 monitors the power consumption of at least one device process. The device 102 may use power meter 108, for example, to measure or estimate the power consumed by a device process at a given point in time, or over a given period of time. The device 102 may monitor the power consumption of any device process. For example, the device 102 may monitor the power consumption of a device process which is active, running, idle, in sleep-mode, etc. This is because a device process may consume more power than expected in any one or more of its operational states. For example, a device process may begin, as a result of the firmware update, consuming more power in an idle state, which may cause the lifetime of the device 102 to decrease.

In embodiments, the step of monitoring power consumption may comprise: monitoring, using at least one monitoring apparatus, power directly consumed by the device process.

In embodiments, the step of monitoring power consumption may comprise: monitoring, using at least one monitoring apparatus, aggregated power consumed by the device while the device process is running; and disaggregating the aggregated power to determine the power consumed by the device process.

At step S308, the device compares the appropriate stored power profile with the monitored power consumption of the device process. For example, if the power consumed by a device process in an idle state is monitored at step S306, then the power profile for that device process in the idle state is used at step S308. Each power profile associated with a particular device process may comprise at least one power consumption band that defines a range of possible power consumption values over time for that device process. The device 102 may monitor the power consumed by the device process, and compare it with the information in the power profile for that device process, to determine whether the device process is operating as expected or if the device process is consuming more or less power than defined in the power profile.

At step S310, if the monitored power consumption of the device process is determined to be within one of the power consumption bands of the associated power profile, then the device process is considered to be performing/operating as expected. The process returns to step S306. However, if the monitored power consumption of the device process does not tall within one of the power consumption bands of the associated power profile, the device 102 takes the necessary action (step S312).

Accordingly, in embodiments of the present techniques, the method may comprise: monitoring power consumption of the device process; comparing the monitored power consumption with the stored at least one power profile; determining whether the monitored power consumption falls within the at least one power consumption band of the received power profile; and taking an action if the monitored power consumption is determined not to fall within the at least one power consumption band.

The step (S312) of taking an action if the monitored power consumption is determined not to fall within the at least one power consumption band may comprise at least one of:
- revoking access to at least one peripheral from the list of one or more peripherals in the power profile of the device process;
- throttling access to at least one peripheral from the list of one or more peripherals in the power profile of the device process (e.g. by reducing voltage or clocking down the peripheral);
- notifying the device process to deconfigure or reconfigure at least one peripheral from the list of one or more peripherals in the power profile of the device process;
- disabling all or part of the or each device cache and/or disabling all or part of any other storage or memory of the device;
- refusing to allocate memory to the device process, allowing to run of selected memory banks to save power;
- terminating the responsible software/hardware process;
- rebooting the device into a clean state, allowing to recover for errors that caused an energy drain This may cause malware stored in RAM to be deleted/removed, resulting in clean power profiles;
- power-cycling the device, in case the memory drain is stateful across reboots or the reset is not fully trusted;
- switching the device into a lower-power operational mode; (reducing clock frequencies and or reducing the core voltage etc.)
- switching the device into a safe mode, either by shutting down or pausing all non-essential processes or by establishing security boundaries between processes (at lower energy-overhead than the unwanted/malicious activity that requires mitigation); Security boundaries can be either created by establishing containers; hypervisor domains and can use established technologies like Arm TrustZone, Intel SGX and others.
- using chip select to terminate a device function (i.e. control on a pin level to turn-off or override a device function);
- using a supervisory process to revoke access to the device process by a peripheral;
- applying a whitelist access control list to control access of peripherals to the device process; and
communicating with an external server.

In embodiments, the step (S312) of taking an action may comprise turning device processes on/off to determine which device process has caused the power consumption divergence.

In embodiments, the step (S312) of taking an action if the monitored power consumption is determined not to fall within the at least one power consumption band may comprise identifying a cause of the power consumption divergence. This may comprise determining that the cause is malware that has inadvertently been installed within device 102, or the firmware update that has been recently installed in device 102. If the cause of the power consumption divergence is determined to be malware or the firmware update, the device 102 may disable all device processes except a process or set of processes for communicating with an external server (e.g. server 110). The device 102 may communicate with an external server to determine what action to take in response to identifying malware or determining that the firmware update causes the device 102 to consume more power than expected. For example, the device 102 may receive, from the external server, instructions to roll-back to a previous version of the firmware, or may receive a new firmware update to install on the device. In embodiments, the device 102 may receive instructions to not take any action with respect to the power consumption divergence. For example, if one device process consumes more power than expected, but most of or all of the other device processes consume less than the expected power or the expected power, the lifetime of device 102 may not be impacted significantly. In this case, the device 102 may be instructed to ignore that one device process consumes more power than expected.

In embodiments, the step (S312) of taking an action if the monitored power consumption is determined not to fall within the at least one power consumption band may comprise: reporting to a user of the device or a remote server that the monitored power consumption has diverged from the stored at least one power profile.

Figure 4:
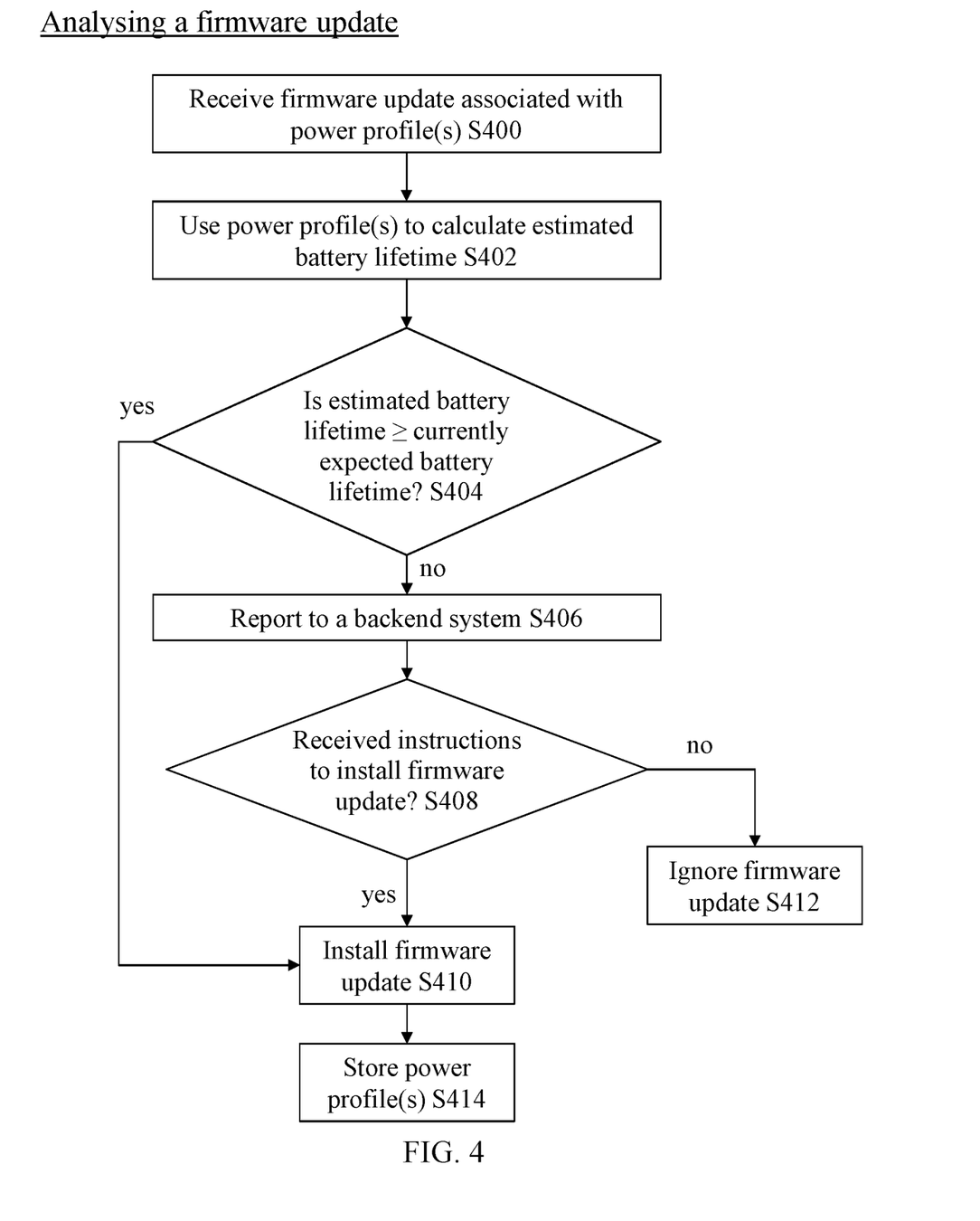
FIG. 4 shows a flowchart of example steps for monitoring operation of a device which occur when a device receives a firmware update.

In embodiments, as mentioned earlier, the device 102 may not install a firmware update immediately, but may analyse the associated (updated) power profiles first to determine whether the firmware update will increase or decrease the battery lifetime of the device 102. FIG. 4 shows a flowchart of example steps for monitoring operation of a device which occur when a device receives a firmware update. The flowchart corresponds to the processing action shown on the right-hand branch of FIG. 2.

At step S400, the device 102 receives a firmware update associated with at least one power profile, or a firmware manifest, as explained above with respect to FIG. 2. If the device 102 receives a firmware manifest, the device 102 may use information within the manifest to determine where the update or the power profiles are located and may then proceed to download, request or otherwise obtain the update/power profiles from this location. If the device 102 receives a firmware update, the device 102 may extract any power profiles from the firmware update, or may obtain the power profiles from a location indicated within the firmware update. Once the device 102 has the power profiles, the device 102 proceeds to analyse the power profiles.

At step S402, the device 102 uses the at least one power profile to calculate a current estimation of the battery lifetime of the device. (The estimate may change over time, and therefore this may be a current estimation only). The device 102 then determines if the current estimated battery lifetime is greater than or equal to an expected battery lifetime (step S404). That is, the processor 104 of device 102 may analyse the power profiles(s) associated with the firmware update/firmware manifest to determine whether installing the firmware update may reduce the operational lifetime of the device 102. The operational lifetime of the device 102 may be reduced if, for example, the device 102 is battery-powered—if the firmware update means the device 102 starts to consume more power, the device 102 will use more power from the battery and therefore, the overall lifetime of the device 102 may be shortened. If at step S404, the current estimated device/battery lifetime is greater than or equal to the expected battery lifetime (which may have been specified by the device manufacturer or otherwise), then the device 102 may proceed to (obtain and) install the firmware update (step S410). The processor 104 may use the power profiles to monitor the ongoing operation of the device 102, i.e. following the process from step S306 of FIG. 3.

However, if at step S404 the power profile(s) associated with the firmware update indicate that more power is going to be consumed by a particular device process, such that the lifetime of the device 102 may be less than the expected battery lifetime, the device 102 may require additional permission or authorisation to install the firmware update.

At step S406, the device 102 may report the results of the analysis to a backend system or external server or user of the device 102, and request instructions on whether or not to install the firmware update. The backend system/external server/user may decide whether the reduction in battery lifetime is acceptable. At step S408, the device 102 checks whether it has received instructions to install the firmware update. If yes, the device 102 proceeds to (obtain and) install the firmware update (step S410) and to store/save the approved power profile(s) associated with the firmware update (S414). The device 102 may use the power profiles associated with the firmware update to monitor the ongoing operation of the device 102, i.e. following the process from step S306 of FIG. 3. If no, the device 102 may ignore the firmware update, i.e. may not install the received firmware update (step S412).

Figure 6:
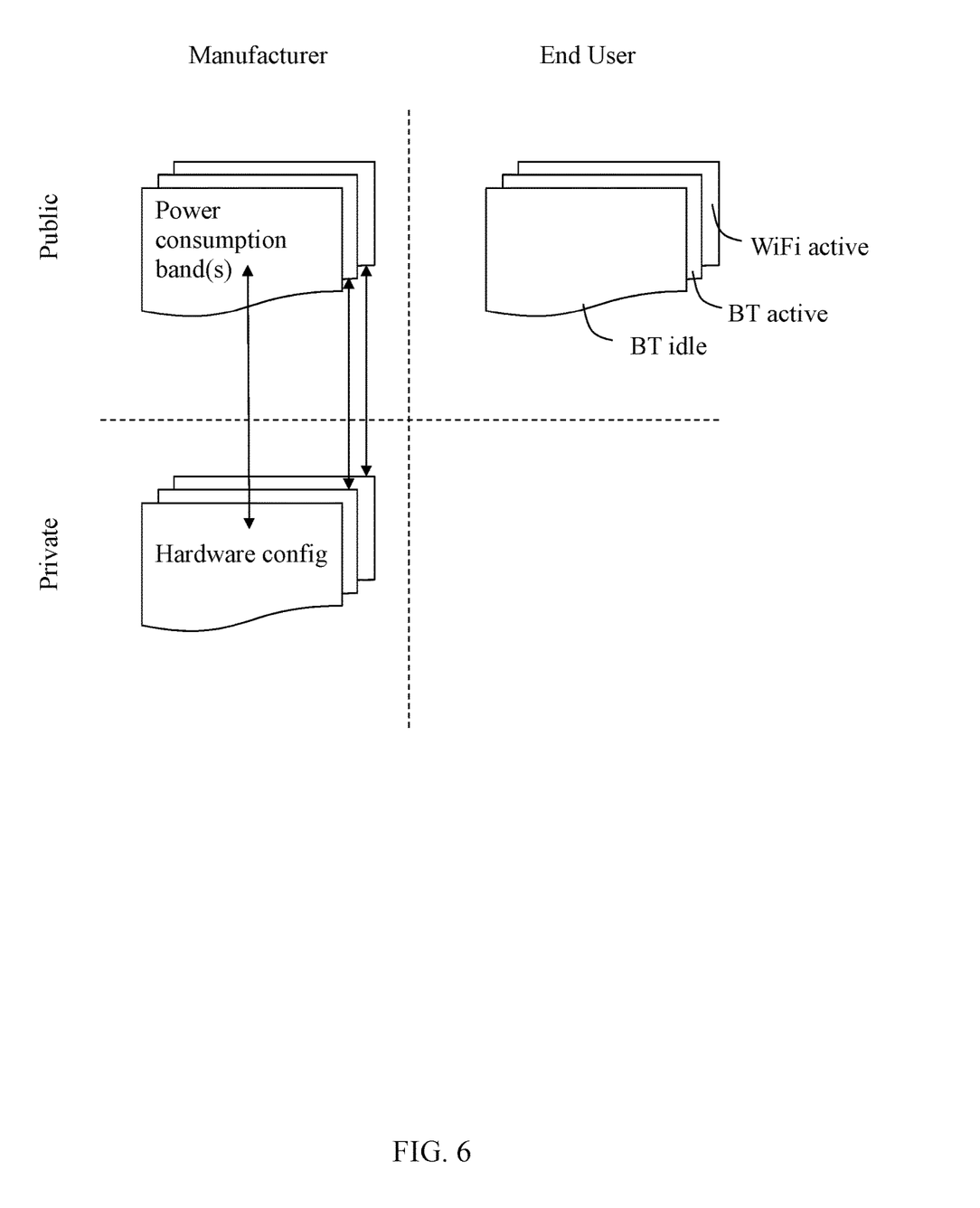
FIG. 6 is a schematic diagram showing how each power profile associated with a firmware update may have a public portion and a private portion.

In embodiments, each power profile associated with the received firmware update comprises a public portion and a private portion. That is, each power profile may be cryptographically signed for security/confidentiality. The private portion of each power profile may contain settings that are confidential and may be set by a manufacturer of the device 102. For example, the private portion may include internal device settings, such as power management, clock changes, I/O configurations, peripheral configurations, system register values, etc. Thus, the private portion may be encrypted for each device 102 or for each class/type of devices. The private portion of each power profile may be considered to contain the instructions for the device 102 to perform specific actions in order to achieve the power profile. In embodiments, the private portion may be or may contain executable code (native or interpreted) for applying the settings/configurations.

FIG. 6 is a schematic diagram showing how each power profile associated with a firmware update may have a public portion and a private portion. The manufacturer of device 102 may create a power profile that comprises a public portion and a private portion. The public portion of the power profile may comprise at least one power consumption band defining a range of possible power consumption values over time of a device process, each power consumption band associated with a probability that the device process power consumption falls within the power consumption band. The private portion of the power profile ma comprise the hardware configuration settings needed to achieve the power consumption values in the public portion. Each public portion may relate to a specific device process state/operation mode (e.g. Bluetooth idle, Bluetooth active, WiFi active, etc.) As shown in FIG. 6, the end user of device 102 may only be able to view the public portion of the power profile. That is, the public power profiles may be delivered to an end user with the firmware update, and both the power profiles and the firmware update may be cryptographically signed by the author for security/authenticity. Each firmware update may be rejected by an end user if the public portions of the power profile indicate power consumption regression, i.e. that the device 102 will start consuming more power if the firmware update is installed. The end user may be able to decide whether they care about the device process state that may consume more power if the firmware update is installed. For instance, if the public portions of the power profiles indicate that the device 102 will use more power during a provisioning process, the user may decide that since provisioning has already taken place, this will not affect the battery lifetime of device 102, and may allow device 102 to install the firmware update.

Accordingly, in embodiments the method of monitoring operation of the device may comprise using the at least one power consumption band in the public part of the at least one power profile to calculate an estimated lifetime of a battery of the device. This may comprise comparing the calculated estimated battery lifetime with an expected battery lifetime; and reporting, to a user or a backend system, if the calculated estimated battery lifetime is lower than the expected battery lifetime.

The method may comprise requesting, from the user, instructions on whether to install the received firmware update if the calculated estimated battery lifetime is lower than the expected battery lifetime, or if the estimated power consumption of the device is higher than the expected power consumption. This may comprise determining, when the monitored power consumption of the device process falls within the at least one power consumption band, a state transition map defining expected state transitions which occur when the device process is running; and storing the state transition map.

Embodiments provide for an optional usage of a trusted domain from a hypervisor, SGX or trustzone-A/-M to perform state transition measurements independently from an untrusted running OS/software—and that OS/software may constantly notify the trusted domain of state changes that require swapping the power profile. In embodiments, the untrusted domain cannot influence the measurement and the integrity of the power profiles, and it clearly announces switches between profiles, the trusted domain can verify if the application is operating within its promised parameters.

The trusted or untrusted security domain can record the state changes (only their absolute probability needs to be recorded, rather than the full log of changes). Using these probabilities, new power profiles can be matched to these historic probabilities to determine whether a specific instance use case of the device will use more power with a firmware update.

In embodiments, a staged rollout of a firmware update may be used to test the update and new power profiles across a sample set of devices. This may allow determination of whether the firmware update causes the power consumption of the device 102 to increase, and which device process or processes are responsible for the power consumption divergence. Device processes could be turned on and off in the sample set of devices to test different power profiles and combinations of power profiles, and thereby determine if any device process results in increased power consumption. This may allow the firmware update to be fine-tuned before it is rolled out to all devices 102. For example, feedback on which device process and associated power profile may be problematic may be provided to the author of the firmware update.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Embodiments of present techniques may be described in the following clauses:

1. A machine-implemented method of monitoring operation of a device, the method comprising: receiving, at the device, a firmware update associated with at least one power profile for a device process, the power profile comprising: at least one power consumption band defining a range of possible power consumption values over time of the device process, each power consumption band associated with a probability that the device process power consumption falls within the power consumption band.

2. The machine-implemented method as described in clause 1 further comprising: storing the at least one power profile following installation of the firmware update.

3. The machine-implemented method as described in clause 2 further comprising: monitoring power consumption of the device process; comparing the monitored power consumption with the stored at least one power profile; determining whether the monitored power consumption falls within the at least one power consumption band of the received power profile; and taking an action if the monitored power consumption is determined not to fall within the at least one power consumption band.

4. The machine-implemented method as described in clause 3 wherein the step of monitoring power consumption comprises: monitoring, using at least one monitoring apparatus, power directly consumed by the device process.

5. The machine-implemented method as described in clause 3 wherein the step of monitoring power consumption comprises: monitoring, using at least one monitoring apparatus, aggregated power consumed by the device while the device process is running; and disaggregating the aggregated power to determine the power consumed by the device process.

6. The machine-implemented method as described in clause 3 wherein the step of taking an action if the monitored power consumption is determined not to fall within the at least one power consumption band comprises at least one of: revoking access to at least one peripheral from a list of one or more peripherals in the power profile of the device process, the list indicating the peripherals that are expected to consume power when the device process is running; throttling access to at least one peripheral from the list of one or more peripherals in the power profile of the device process; notifying the device process to deconfigure or reconfigure at least one peripheral from the list of one or more peripherals in the power profile of the device process; disabling device caches; refusing to allocate memory to the device process; terminating the device process; rebooting the device; restarting the device; power-cycling the device; switching the device into a low-power operational mode; switching the device into a safe mode; using chip select to terminate a device function; using a supervisory process to revoke access to the device process by a peripheral; applying a whitelist access control list to control access of peripherals to the device process; and communicating with an external server.

7. The machine-implemented method as described in clause 3 wherein the step of taking an action if the monitored power consumption is determined not to fall within the at least one power consumption band comprises identifying a cause of the power consumption divergence.

8. The machine-implemented method as described in clause 7 wherein the step of identifying a cause of the power consumption divergence comprises determining that the cause is malware.

9. The machine-implemented method as described in clause 7 wherein the step of identifying a cause of the power consumption divergence comprises determining that the cause is the firmware update.

10. The machine-implemented method as described in clause 9 further comprising disabling all device processes except a process or set of processes for communicating with an external server.

11. The machine-implemented method as described in clause 10 further comprising: receiving instructions to rollback to a previous version of the firmware, or receiving a new firmware update to install on the device.

12. The machine-implemented method as described in clause 3 wherein the step of taking an action if the monitored power consumption is determined not to fall within the at least one power consumption band comprises: reporting to a user of the device or a remote server that the monitored power consumption has diverged from the stored at least one power profile.

13. The machine-implemented method as described in clause 1 wherein the at least one power profile associated with the received firmware update comprises a public portion and a private portion, wherein the public portion comprises an indication of which device process the at least one power profile is associated with and the at least one power consumption band.

14. The machine-implemented method as described in clause 13 further comprising: using the at least one power consumption band in the public part of the at least one power profile to calculate an estimated lifetime of a battery of the device.

15. The machine-implemented method as described in clause 14 further comprising: comparing the calculated estimated battery lifetime with an expected battery lifetime; and reporting, to a user or a backend system, if the calculated estimated battery lifetime is lower than the expected battery lifetime.

16. The machine-implemented method as described in clause 15 further comprising: requesting, from the user, instructions on whether to install the received firmware update if the calculated estimated battery lifetime is lower than the expected battery lifetime.

17. The machine-implemented method as described in clause 3 further comprising: determining, when the monitored power consumption of the device process falls within the at least one power consumption band, a state transition map defining expected state transitions which occur when the device process is running; and storing the state transition map.

18. The machine-implemented method as described in clause 17, wherein an untrusted domain notifies a trusted domain of occurring state transitions, the trusted domain verifying if the device process is operating within the power consumption band.

19. The machine-implemented method as described in clause 18, wherein the trusted or untrusted domain records the probability of occurring state transitions.

20. The machine-implemented method as described in clause 19, including comparing new power profiles with the recorded probability of occurring state transitions and determining whether a specific instance use case of device process will use additional power firmware update.

21. A computer program product comprising a computer-readable storage medium storing computer program code operable, when loaded onto a computer and executed thereon, to cause said computer to carry out a method comprising: receiving, at the device, a firmware update associated with at least one power profile for a device process, the power profile comprising: at least one power consumption band defining a range of possible power consumption values over time of the device process, each power consumption band associated with a probability that the device process power consumption falls within the power consumption band.

22. An apparatus comprising: at least one battery; at least one monitoring device to monitor power consumption; at least one processor; and at least one communication module to receive a firmware update associated with at least one power profile for a device process, the power profile comprising: at least one power consumption band defining a range of possible power consumption values over time of the device process, each power consumption band associated with a probability that the device process power consumption falls within the power consumption band.

23. A system comprising: at least one server; and at least one apparatus, the apparatus comprising: at least one battery; at least one processor to; and at least one communication module to communicate with the at least one server and to receive a firmware update associated with at least one power profile for a device process, the power profile comprising: at least one power consumption band defining a range of possible power consumption values over time of the device process, each power consumption band associated with a probability that the device process power consumption falls within the power consumption band.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A machine-implemented method of monitoring operation of a device, the method comprising:
  receiving, at the device, a firmware update associated with at least one power profile for a device process, the power profile comprising a power consumption probability distribution having at least one power consumption band defining a range of power consumption values over time of the device process;
  applying, at the device, the firmware update;
  monitoring power consumption of a device process defined in the associated power profile;
  comparing the monitored power consumption with the at least one power profile;
  determining whether the monitored power consumption falls within the at least one power consumption band of the received power profile; and
  taking an action if the monitored power consumption is determined not to fall within the at least one power consumption band.

2. The machine-implemented method as claimed in claim 1 further comprising:
  storing the at least one power profile following installation of the firmware update.

3. The machine-implemented method as claimed in claim 1, wherein said monitoring power consumption comprises:
monitoring, using at least one monitoring apparatus, power directly consumed by the device process.

4. The machine-implemented method as claimed in claim 1, wherein said monitoring power consumption comprises:
monitoring, using at least one monitoring apparatus, aggregated power consumed by the device while the device process is running; and
disaggregating the aggregated power to determine the power consumed by the device process.

5. The machine-implemented method as claimed in claim 1, wherein said taking an action if the monitored power consumption is determined not to fall within the at least one power consumption band comprises at least one of:
revoking access to at least one peripheral from a list of one or more peripherals in the power profile of the device process, the list indicating the peripherals that are expected to consume power when the device process is running;
throttling access to at least one peripheral from the list of one or more peripherals in the power profile of the device process;
notifying the device process to deconfigure or reconfigure at least one peripheral from the list of one or more peripherals in the power profile of the device process;
disabling device caches;
refusing to allocate memory to the device process;
terminating the device process;
rebooting the device;
restarting the device;
power-cycling the device;
switching the device into a low-power operational mode;
switching the device into a safe mode;
using chip select to terminate a device function;
using a supervisory process to revoke access to the device process by a peripheral;
applying a whitelist access control list to control access of peripherals to the device process; and
communicating with an external server.

6. The machine-implemented method as claimed in claim 1, wherein said taking an action if the monitored power consumption is determined not to fall within the at least one power consumption band comprises identifying a cause of the power consumption divergence.

7. The machine-implemented method as claimed in claim 6 wherein said identifying a cause of the power consumption divergence comprises determining that the cause is malware.

8. The machine-implemented method as claimed in claim 6 wherein said identifying a cause of the power consumption divergence comprises determining that the cause is the firmware update.

9. The machine-implemented method as claimed in claim 8 further comprising disabling all device processes except a process or set of processes for communicating with an external server.

10. The machine-implemented method as claimed in claim 9 further comprising:
receiving instructions to roll-back to a previous version of the firmware, or
receiving a new firmware update to install on the device.

11. The machine-implemented method as claimed in claim 1, wherein said taking an action if the monitored power consumption is determined not to fall within the at least one power consumption band comprises:
reporting to a user of the device or a remote server that the monitored power consumption has diverged from the stored at least one power profile.

12. A machine-implemented method of monitoring operation of a device, the method comprising:
receiving, at the device, a firmware update associated with at least one power profile for a device process, the power profile including a power consumption probability distribution having at least one power consumption band defining a range of power consumption values over time of the device process; and
using the at least one power consumption band in a public portion of the at least one power profile to calculate an estimated lifetime of a battery of the device,
where the at least one power profile associated with the received firmware update comprises a private portion and the public portion, and the public portion includes an indication of which device process the at least one power profile is associated with and the at least one power consumption band.

13. The machine-implemented method as claimed in claim 12 further comprising:
comparing the calculated estimated battery lifetime with an expected battery lifetime; and
reporting, to a user or a backend system, if the calculated estimated battery lifetime is lower than the expected battery lifetime.

14. The machine-implemented method as claimed in claim 13 further comprising:
requesting, from the user, instructions on whether to install the received firmware update if the calculated estimated battery lifetime is lower than the expected battery lifetime.

15. The machine-implemented method as claimed in claim 1, further comprising:
determining, when the monitored power consumption of the device process falls within the at least one power consumption band, a state transition map defining expected state transitions which occur when the device process is running; and
storing the state transition map.

16. The machine-implemented method as claimed in claim 15, wherein an untrusted domain notifies a trusted domain of occurring state transitions, the trusted domain verifying if the device process is operating within the power consumption band.

17. The machine-implemented method as claimed in claim 16, including comparing new power profiles with the recorded occurring state transitions and determining whether a specific instance use case of device process will use additional power firmware update.

18. An apparatus comprising:
at least one device to measure or estimate power consumption;
at least one processor; and
at least one communication module to receive a firmware update associated with at least one power profile for a device process, the power profile comprising a power consumption probability distribution having at least one power consumption band defining a range of power consumption values over time of the device process,
where the processor is configured to:
apply the firmware update,
monitor power consumption of a device process defined in the associated power profile,
compare the monitored power consumption with the at least one power profile, determine whether the monitored power consumption falls within the at least one power consumption band of the received power profile, and take an action if the monitored power consumption is determined not to fall within the at least one power consumption band.

\* \* \* \* \*